UNITED STATES PATENT OFFICE.

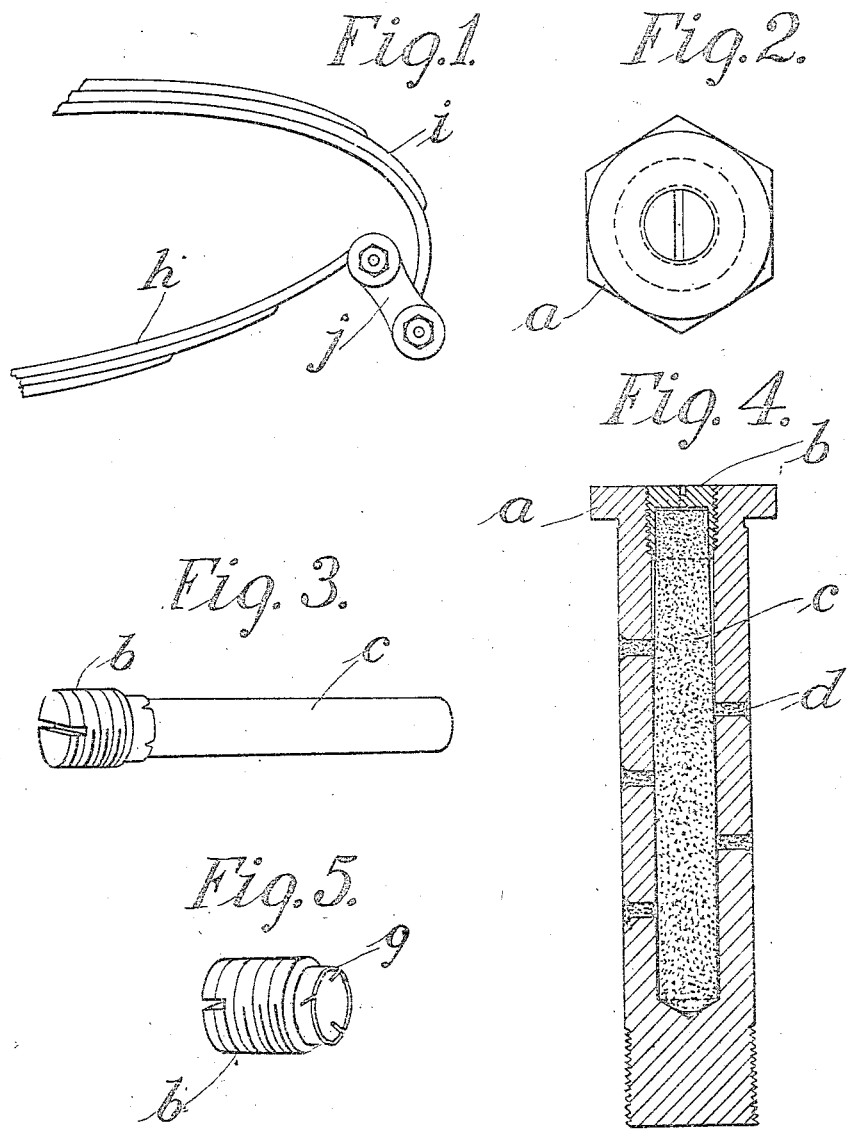

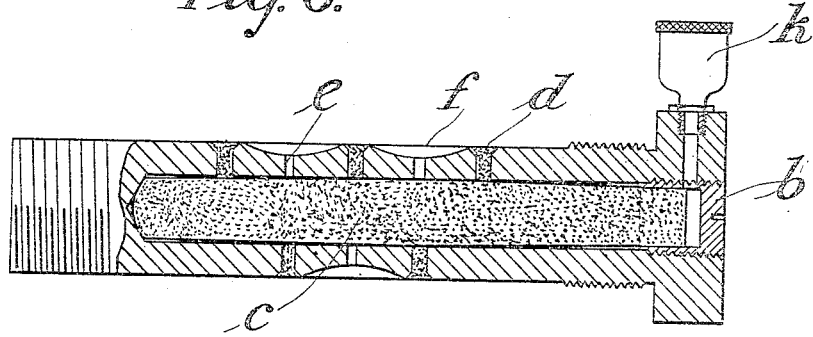
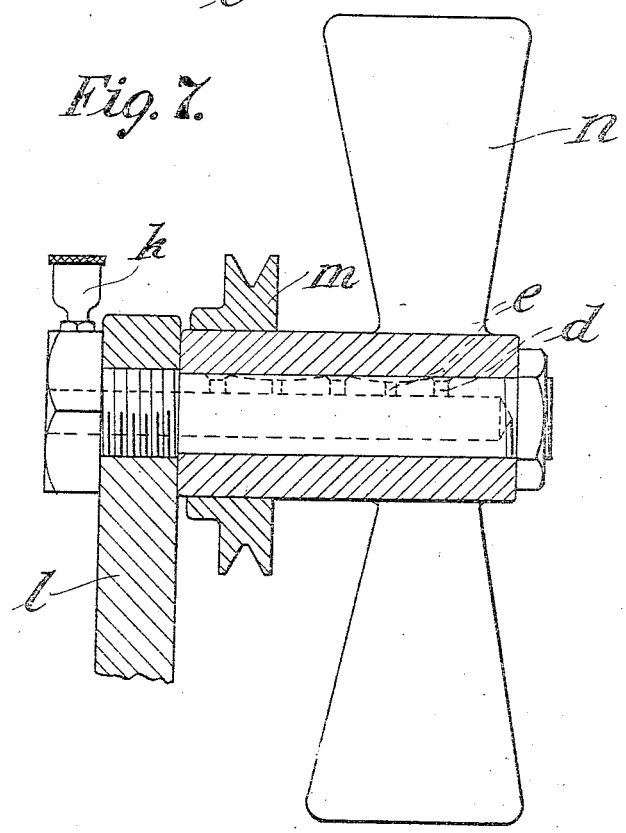
WITNESSES:
H. E. Hartwell.
M. C. Hunter
INVENTORS.
David Landau and
Herman G. Farr.
BY
Chapin & Co
ATTORNEYS

DAVID LANDAU, OF NEW YORK, N. Y., AND HERMAN G. FARR, OF SPRINGFIELD, MASSACHUSETTS.

AUTOMATIC SELF-LUBRICATING BOLT.

1,159,779.  Specification of Letters Patent.  Patented Nov. 9, 1915.

Application filed May 14, 1913.  Serial No. 767,532.

*To all whom it may concern:*

Be it known that we, DAVID LANDAU and HERMAN G. FARR, citizens of the United States of America, residing, respectively, at New York, in the county and State of New York, and at Springfield, in the county of Hampden and State of Massachusetts, have invented new and useful Improvements in Automatic Self-Lubricating Bolts, of which the following is a specification.

This invention relates to an automatic self-lubricating bolt such as may be used, for example, in pivotally connecting the two ends of a spring, particularly in automobile construction, and to such a bolt as is used to support, for example, a rotating part or hub, such as a fan hub in automobile or other use.

The invention may be broadly applied for lubricating the rubbing surfaces of any two or more parts, any one of which may rotate with respect to the other.

The invention is disclosed in its preferred form as applied to a pivotal spring connection where the rubbing parts have uncertain and varied movements, one with respect to another.

Another preferred form of the invention is disclosed in connection with a supporting and bearing means for the hub of a fan in which the rubbing parts have a very high and certain rotative speed with relation to one another.

The forms of the invention herein are disclosed for the purpose of illustrating the manner in which the invention may be preferably carried out and not with any idea of limiting the invention, broadly, to the specific uses and construction shown and disclosed herein.

The invention, broadly, comprises a bolt structure which is designed to support a hub or collar in such a manner that the contacting surfaces may have relative movement, one to the other, together with means for supplying, in an automatic and self-containing manner, the necessary quantity of lubricant in the right condition to render such relative movement free and easy. This is preferably accomplished by providing an axial cylindrical recess in the bolt, having radial openings to the surface of the bolt, and providing a wick adapted to be soaked with a suitable lubricant for insertion into said axial recess. The radial holes are also supplied with similar wick material so that, when the axial recess is filled with the wick material soaked in lubricant, there will be contact between the wick material in the axial hole and in the radial holes. With this structure and arrangement, the surface of any part moving on the exterior surface of the bolt, as a bearing, will cause the lubricant in the wick material in the axial recess to be sucked up by capillary action through the wick material in the radial holes and thus automatically fed to the surface of the bolt, on which surface it will serve as a necessary lubricant for the moving part. With a structure of this kind, the lubricant will be fed to the surface of the bolt in proportion to the speed at which the contacting surface moves with relation to the surface of the bolt. Thus, the lubricant will be fed between the moving surfaces in the necessary amount to provide for the movements actually taking place. Means are also preferably, but not necessarily, provided for allowing the lubricant thus fed to the surface of the bolt to drain freely back to the wick material in the axial recess of the bolt. This is accomplished by providing cut out spaces or hollows in the surface of the bolt and preferably adjacent to the radial openings in the bolt and by connecting these hollows by a free passage to the axial recess in the bolt. It will be noted that the invention may be applied as a lubricating means for shaft bearings and the like as well as lubricating bolt construction.

The object of the invention is to provide an automatic self-lubricating bolt or structure of the class mentioned and also to provide such a structure which may be supplied with the necessary quantity of lubricant to last for a very long time as compared to the length of time that the ordinary supply of lubricant lasts under the present practice and also to provide means for automatically feeding this lubricant to the wearing surface of the bolt in different quantities each in proportion to the varying speeds of the moving surfaces on the bolt.

Another object of the invention is to provide means for inserting the wick material in the self-lubricating bolt in the most convenient manner so that the same may be inserted or withdrawn without danger of injuring the wick material.

Another object of the invention is to provide a bolt of the kind described with means for conveniently keeping the wick material therein saturated with lubricant without removing it from the recess in the bolt.

Another object of the invention is to provide an automatic lubricating bolt in connection with which a great range of different kinds of lubricants in different conditions may be safely used.

Another object of the invention is to provide an automatic self-lubricating bolt which, as a self-contained structure, automatically provides lubricant to the parts as needed which lubricant may be of such a nature that it is not materially affected in viscosity under ordinary varying temperatures.

Another object of the invention is to provide an automatic self-lubricating bolt which will have all the advantages of self-lubricating means which are common in the well-known grease cup constructions but which do not have the disadvantages of such grease cup constructions.

With these objects in view, the preferred form of the invention is specifically illustrated in the accompanying drawings in order to disclose the manner in which the invention may be carried out, but it is to be understood that the invention may be carried out in many other ways without departing from the broad scope of the invention as claimed.

In the drawings: Figure 1 shows the bolt as applied in a pivotal connecting arrangement for the two ends of a vehicle spring construction. Fig. 2 is a plan view of the bolt structure. Fig. 3 is a perspective view of the wick material designed to hold the supply of lubricant and enter the axial recess of the bolt together with the means for holding, inserting, and extracting said wick material from the bolt. Fig. 4 is a sectional view of the bolt structure with all the parts in place. Fig. 5 is a perspective view of the cap nut or head which is designed to receive the wick material to most conveniently handle the latter. Fig. 6 is a sectional view of a form of the invention in which the lubricant may be automatically supplied to the wick material in the axial hole. Fig. 7 is a view, partly in section, showing the manner in which the invention may be applied to provide an automatic self-lubricating bolt for use with a rapidly rotating part such as a fan structure.

Referring to Fig. 1, it is well known that the bolts connecting the ends of the two parts of vehicle springs frequently need to be oiled or greased as, otherwise, the wearing surfaces of the connecting bolt will soon be worn out in which case the movements of the spring will cause considerable noise. It is customary to remove these spring bolts frequently and rub grease over the surfaces. It is also customary to provide grease cups which will force the grease to the wearing surfaces without removing the bolt. The disadvantage of the latter practice is that the grease that must be used in the grease cups changes its viscosity greatly with the temperature; thus, when it is very warm, too much will be fed, and, when it is cold, not enough grease will be fed to the wearing parts; and, in addition, such grease cups are quite disagreeable to handle. It will be noted that in the use of a bolt, such as shown in Fig. 1, the rubbing parts do not move at very high speed nor at constant speed one with relation to the other, but there is a continual rubbing action due to the movements of the springs.

Applicants provide a bolt structure such as shown in Fig. 4 in order to carry out their invention in connection with the use as shown in Fig. 1. This bolt, shown in Fig. 4, comprises a main bolt portion $a$ in which there is an axial recess extending almost the whole length of the bolt. In this recess a cylindrical piece of wick material $c$ is designed to be inserted. This wick material has, preferably, attached at one end a hollow holding or cap nut $b$, best illustrated in Fig. 5. One end of the cylindrical wick material is inserted in the open end of the nut $b$, and the sharp prongs $g$ are then bent downwardly and forced into the wick material, as illustrated in Fig. 3. This arrangement prevents any relative movement between the wick material and the holding nut $b$. With this arrangement, the wick material $c$ may be inserted in the axial hole in the bolt $a$, and, by turning it slowly as it is inserted, it will work easily into the hole without any tendency to injure the wick material as in the case where it is necessary to force the wick material by a direct axial thrust into said recess. Threads are provided in the bolt $a$ to receive the thread in the holding nut $b$ as clearly shown in Fig. 4. In this way, the wick material $c$ may be forced home against the bottom of the axial recess of the bolt. The length of this recess is slightly shorter than the length of the wick material together with the holding nut $b$ so that, as the wick material is forced home, it is necessarily expanded in the last few turns of the holding nut $b$. This causes the wick material to be forced radially into close contact with the entrances to the radial openings $d$. In these openings, additional wick material is provided, and the openings at their outer end are preferably counter-sunk, and the wick material is headed over to fill the counter-sunk openings in the manner shown in Fig. 4. With this construction, the wick material in the radial openings $d$ cannot be easily pulled out of the radial openings when the wick material $c$ is taken out for a new supply of lubricant. It is to be understood that, before the material *c* is inserted in the recess, it is thoroughly soaked in any kind of oil, and it may be soaked even with very dirty oil and still serve the main purpose desired. From the showing in Fig. 4, it will be seen that the movement of any hub on the wearing surface of the bolt *a* will cause the lubricant to work out from the wick material *c* through the wick material in the radial openings *d* to the contacting surfaces, and, even where the lubricant in the wick material *c* is dirty, although such oil which is sucked out through the wick material *d* will necessarily be strained and clean.

The lubricant will work out through the radial holes in proportion to the movements of the hub or collar supported by the bolt *a* and thus an automatic self-lubricating bolt of the kind desired is provided. Where the bolt is used as shown in connection with the illustration in Fig. 1, it will not be necessary to furnish a fresh supply of lubricant except at long intervals, and, when it is necessary to furnish a fresh supply, the bolt will not have to be removed for the holding nut *b* may be taken out of the bolt, and the wick material *c* dipped in a supply of lubricant and reinserted.

Where the self-lubricating bolt is designed to be used with a part running at high speed, such as the hub of the fan *n* as shown in Fig. 7, it is found convenient and advantageous to supply a means for returning any excess oil fed to the wearing surfaces back to the wick material *c*. For this purpose, referring to Fig. 6, the hollows *f* with their ends adjacent to the outer ends of the radial holes are milled on the outer surface of the bolt, and the bottom of these hollows have free open communication with the wick material *c* through the openings *e*. It will be understood that, when the fan *n* is driven at speed by the driving pulley *m*, a considerable amount of lubricant will be sucked out through the radial openings *d* from the wick material *c* which quantity will be in proportion to the speed at which the fan is running. If the fan is suddenly stopped, or slowed down, the lubricant which is not then necessary for use will work its way back to the wick material *c* through the hollows *f* and the open holes *e*. When the fan is running at very high speed, no lubricant can be sucked out through the holes *e* and the hollows *f* because there is no wick material therein to aid in the feed of the lubricant.

In a fan structure, such as shown in Fig. 7, where it is necessary to use a considerable amount of oil and in similar structures, it is preferable to supply a lubricant cup *k* screwed into the head of the bolt as shown in Figs. 6 and 7 and having a free passage provided in the bolt and the holding nut *b* to the wick material. In this case, it is not necessary to remove the wick material *c* after it is once inserted for a fresh supply of lubricant may be furnished to the wick material through the cup *k* and the connecting passage mentioned.

While the invention has been shown and described in some of its specific forms, it is to be understood that this has been done with the idea of illustrating the uses to which the invention may be put and not with an idea of limiting the broad invention to the forms shown.

What we claim is:—

1. A lubricating bolt structure, comprising, in combination, a main bolt portion provided with an axial recess and connecting openings from said recess to the wearing surface of the bolt, an absorbent material packed in said recess and openings, and means attached to the absorbent material to subject the same to pressure to cause it to expand and fill the recess, whereby lubricant contained in the material in the axial recess may be gradually sucked out through the material in the openings to the wearing surface of the bolt, all in the manner and for the purpose described.

2. An automatic self-contained self-lubricating bolt provided with an axial cylindrical recess, radial openings from the recess to the wearing surface of the bolt, together with a cylindrical body of wick material constructed and arranged to enter said recess and engage the end of said recess, and a cap nut for said body directly fastened thereto to move therewith at all times and to serve as a means for operating the wick material to subject the same to pressure and for closing the said recess, all for the purpose described.

3. An automatic self-contained self-lubricating bolt provided with an axial cylindrical recess, radial openings from the recess to the wearing surface of the bolt having wick material packed therein, together with a cylindrical body of wick material, and a head piece therefor adapted to close the opening to the recess and force the wick material against the end of the recess and thus expand the same radially into close contact with the wick material in the radial openings, all for the purpose described.

4. A self-contained automatic self-lubricating bolt structure, comprising, in combination, a main cylindrical body portion having an axial cylindrical recess therein extending almost to the end of the bolt having radial openings in communication with the wearing surfaces of the bolt from the said axial recess, wick material packed in said radial openings, a cylindrical body of wick material arranged to enter and fill said axial recess and having an adjustable head piece adapted to close the opening of said recess and attached to the wick material whereby the latter may be compressed to feed the lubricant therein, the wearing surface of said bolt having several hollows provided therein the bottoms of which are in open communication with the axial recess, all for the purpose described.

5. A self-lubricating bolt, comprising, in combination, a main bolt portion having an axial cylindrical recess with openings therefrom connecting with the wearing surface of the bolt, a cylindrical body of wick material adapted to enter said recess, a hollow nut adapted to fit over the end of said body of wick material, prongs provided in the edge thereof arranged to be bent down and forced into the wick material to hold the nut and wick material firmly together, said hollow nut being arranged to engage threads in the outer end of said axial recess and thus close the end of said recess.

6. A self-lubricating bolt for general application, comprising, a socketed bearing portion having threads at one end, a head at the other and apertures in its end portion leading to said socket, a wick adapted to fill said socket and adjustable removable means directly secured to said wick and adapted to press the wick against the walls of the socket or remove it therefrom.

DAVID LANDAU.

Witnesses:
J. M. WATSON,
R. A. SCHAY.

HERMAN G. FARR.

Witnesses:
SEBASTIAN HINTON,
HENRY A. BOOTH.